(12) United States Patent
Meza et al.

(10) Patent No.: US 8,894,472 B2
(45) Date of Patent: Nov. 25, 2014

(54) TOOL FOR MACHINING SURFACES OF PARTS

(75) Inventors: Olga Meza, Stockholm (SE); Andrey Ponomarev, St. Petersburg (RU)

(73) Assignee: Virtum I Sverige AB, Stockholm (SE)

( * ) Notice: Subject to any disclaimer, the term of this patent is extended or adjusted under 35 U.S.C. 154(b) by 918 days.

(21) Appl. No.: 13/640,295

(22) PCT Filed: Sep. 22, 2008

(86) PCT No.: PCT/SE2008/000521
§ 371 (c)(1),
(2), (4) Date: Oct. 9, 2012

(87) PCT Pub. No.: WO2010/033056
PCT Pub. Date: Mar. 25, 2010

(65) Prior Publication Data
US 2013/0072098 A1    Mar. 21, 2013

(51) Int. Cl.
*B24D 3/04* (2006.01)
*C01B 31/02* (2006.01)
*B23B 29/02* (2006.01)
*B23B 51/00* (2006.01)
*B23C 5/00* (2006.01)
*B24D 5/00* (2006.01)

(52) U.S. Cl.
CPC . *B24D 3/04* (2013.01); *C01B 31/02* (2013.01); *B23B 29/022* (2013.01); *B23B 51/00* (2013.01); *B23B 2226/275* (2013.01); *B23C 5/003* (2013.01); *B24D 5/00* (2013.01)
USPC ........................................... 451/540; 451/548

(58) Field of Classification Search
CPC .................................. B24D 3/04; C01B 31/02
USPC ..................................................... 451/540, 548
See application file for complete search history.

(56) References Cited

U.S. PATENT DOCUMENTS

| | | |
|---|---|---|
| 6,129,077 A | 10/2000 | Parini |
| 8,460,763 B2 * | 6/2013 | Kouznetsov et al. ......... 427/569 |
| 8,742,001 B2 * | 6/2014 | Ponomarev et al. .......... 524/496 |
| 2007/0187153 A1 | 8/2007 | Bertagnolli |
| 2011/0008576 A1 * | 1/2011 | Kouznetsov et al. ......... 428/156 |

FOREIGN PATENT DOCUMENTS

WO    2008/045149 A2    4/2008

* cited by examiner

*Primary Examiner* — Maurina Rachuba
(74) *Attorney, Agent, or Firm* — Knobbe Martens Olson & Bear LLP

(57) ABSTRACT

A tool for machining parts and particularly surfaces of parts includes a machining head and a main, supporting body (3) made of carbon fibers bonded by a polymer binder and additionally contains polyhedral multilayer carbon nanostructures of the fulleroid type having e.g. a layer-to-layer distance of 0.34-0.36 nm, taken in a quantity of 0.05-50 wt % of the mass of the polymer binder. The main body thereby obtains an increased stiffness and strength.

4 Claims, 1 Drawing Sheet

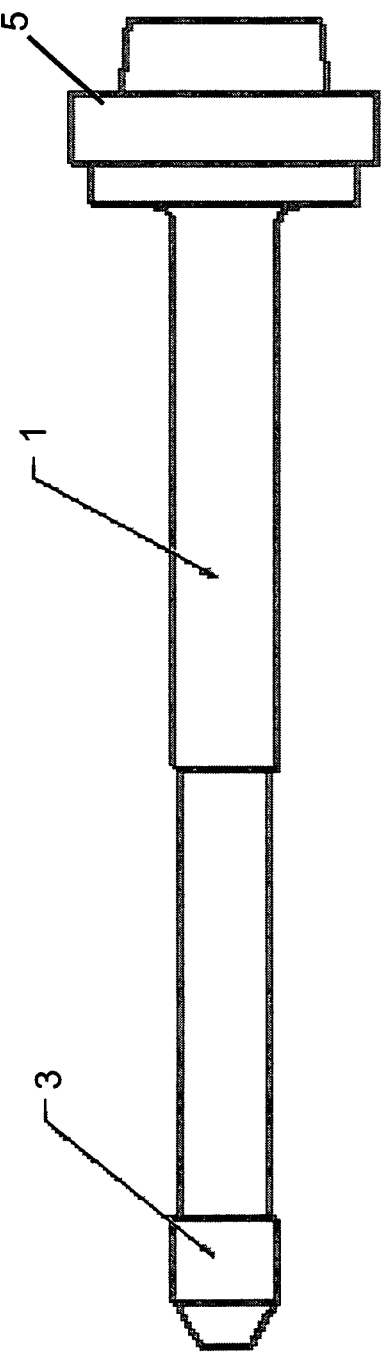

TOOL FOR MACHINING SURFACES OF PARTS

CROSS-REFERENCE TO RELATED APPLICATION

This application is the U.S. National Phase under 35. U.S.C. §371 of International Application PCT/SE2008/000521, filed Sep. 22, 2008. Russian Patent Application No. RU2007000109731/02 is another prior foreign application for which priority is not claimed. The Russian Patent Application was filed on Mar. 12, 2007, published on Sep. 20, 2008, and granted on May 10, 2009.

TECHNICAL FIELD

The present invention relates to tools for machining surfaces of parts and particularly to vibrating and shock-absorbing tools.

BACKGROUND

A tool for machining surfaces of parts usually comprises a main body and a cutting, milling, or polishing edge or head. An insufficient rigidity of the main body of such a tool and the vibrations resulting therefrom when the tool is used can result in a reduced efficiency of and a reduced accuracy of the machining operation and also heating of the main body, can require a higher driving power, and the operation of such a tool may also be accompanied with considerable noise. To adapt the tool to the operation conditions, various additional devices can be used which reduce the vibration of the main body and which thus can be called vibration damping, shock-absorbing or vibration attenuating devices.

A tool for cutting material, including a main body configured as a metal rod and a cutting edge, is disclosed in the published International patent application WO 02/45892, where the main body is fitted with several damping elements. The damping elements are made of the same metal as that of the main body or of another metal and are designed as variously shaped plates that are mounted to the surface of the main body.

Separate damping plates, however, may create difficulties in the balancing of the tool and may be unreliable in operation.

In the published European patent application 1266710 a tool for machining is disclosed having a main body comprising two parts. The upper part has a cylindrical recess and the lower part has a cylindrical protrusion fitting in the cylindrical recess of the upper part with a gap. A pad made from viscous elastic material is inserted into the gap. It is stated that the pad absorbs vibration without causing heating.

Such a structure, however, may not ensure a sufficient rigidity and allows the tool to be damped only in the region of low frequencies; and therefore, the cutting rate/speed and the finish quality cannot be increased.

Another tool for machining surfaces of parts is disclosed in U.S. Pat. No. 6,129,077 and includes a main body and a machining head, the main body being substantially made from a composite high-rigidity material including e.g. carbon fibres bonded with high molecular-weight polymer fibres, or generally "carbon fibres, kevlar fibres, glass fibres, synthetic material fibres, plastic materials enriched with extremely hard substances (silicates), sheets of carbon fibres arranged alternately with glass fibres or also sintered carbon". The tool is designed for cutting, polishing and other machining of surfaces of glass, wood, brick, ceramics, granite and similar materials. Pieces of a composite material may generally have a vibrating and damping effect when machining such materials.

When machining metal parts, however, the rigidity and elasticity of the tool should be higher than when polishing, particularly, parts of materials such as stone, ceramics, glass, etc.

SUMMARY

It is an object of the invention to provide an efficient machining tool, in particular a machining tool by means of which e.g. better results of finishing the machining can be obtained or which allows a higher rate or speed of the cutting or abrasive action.

The object of the invention may be obtained with a machining tool that includes a composite main body having increased stiffness and strength.

Generally, thus a tool is intended for processing components in processing machine tools. The tool has a main body, one end of which is arranged to be attached to a holder of the processing machine tool and a machining head fixed at the opposite end of the main body. For the purpose of improving the quality of and speed when processing or working components, the main body or at least a substantial portion thereof is made from a carbon fibre reinforced polymer material in which, as a filler, high-elastic modulus carbon fibres are used. In the polymer matrix fullerene type carbonic nano-particles are introduced.

It appears that generally a tool for machining surfaces of parts, in order to have a high mechanical stiffness, can have a main body, at least a substantial portion of which is manufactured using carbon fibres. Thus, the main body can be made from carbon fibres bonded by a polymer binder and it can further contain polyhedral multilayer carbon nanostructures of the fulleroid type that e.g. have a layer-to-layer distances 0.34-0.36 nm and a specific electric resistance not higher than $2.5 \times 10^{-4}$ Ohm·cm at a pressure of 1.2 KBar, the share of nanostructures being present in the range of 0.05-20 wt % of the mass of the polymer binder.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow also taken with reference to the accompanying drawing, in which:

FIG. 1 is a side view of an internal grinding tool.

DETAILED DESCRIPTION

A tool for machining surfaces of parts generally has a main body and a machining head, the main body supporting the machining and being the mechanical connection between the frame of a machine and the machining head. The internal grinding tool illustrated in FIG. 1 has a main body or quill designed as a bar 1, i.e. an elongated body having e.g. a constant diameter or a substantially constant diameter, that at one end carries a grinding wheel 3 and at the opposite end has a larger diameter portion 5 for clamping the grinding tool in the spindle of a grinding machine, not shown.

It appears that generally a tool for machining surfaces of parts, in order to have a high mechanical stiffness, can have a main body, at least a substantial portion of which is manufactured using carbon fibres. Thus, the main body can be made from carbon fibres bonded by a polymer binder and it can further contain polyhedral multilayer carbon nanostructures of the fulleroid type, the share of nanostructures being present in the range of 0.05-20 wt % of the mass of the polymer binder.

The main body of the tool, or the substantial portion thereof, can thus be made from a carbon-filled polymer material, i.e. carbon fibres bonded using a polymer binder material, and the binder material can also contain, in addition to the polyhedral nanostructures, fullerenes of the general formula C-60, C-70, C-76, C-78, C-84, i.e. fullerenes consisting of molecules having between 60 and 84 carbon atoms, or mixtures thereof, or carbon nanotubes, or mixtures of fullerenes and nanotubes. The total quantity of all said nanoadditives, including the polyhedral multilayer carbon nanostructures of the fulleroid type and possibly fullerenes and carbon nanotubes, may not exceed 20 wt % of the mass of the polymer binder. The weight ratio of the amount of the polyhedral nanostructures to the amount of the fullerenes and nanotubes in the material of the main body can range from 5:1 to 1:10 000.

Polyhedral multilayer carbon nanostructures of the fulleroid type can be manufactured by extraction from the crust of a cathode deposit produced by thermal or plasma deposition when using a graphite anode in a direct current discharge in the gap between the anode and the cathode in an inert gas atmosphere as described in the Russian patent 2196731. The nanostructures disclosed in this patent have e.g. an interlayer distance 0.34-0.36 nm, an average particle size of 60-200 nm and a specific electric resistance not exceeding $2.5 \times 10^{-4}$ Ohm·cm at a pressure of 120 MPa.

Polyhedral multilayer carbon nanostructures of the fulleroid type have a high thermal and pressure resistance. It may e.g. be higher than 10 000 MPa at temperatures higher than 3 000° C.

Fullerenes and nanotubes can be produced as described in the Russian patent 2234457. Straight filaments having a diameter of 1 to 500 μm, such as carbon fibres incorporated in unidirectional fabrics, can be used as the carbon fibres. In particular, a fabric of unidirectional filaments was used that consisted of carbon fibre strands positioned along each other in one plane and bonded transversely by glass threads, such as a unidirectional fabric sold under the name of YSH-60A by the corporation Nippon Graphite Fibre Corp. (Japan). Before impregnation with a binder, the glass threads are removed.

As the polymer binder material e.g. epoxide polymers, epoxiphenol polymers, polyesters, imidazole binders such as polyimidazole, polyoxybenzimidazole, etc. can be used. The amount of the polymer component is 0.05-50 wt % of the mass of the nanocarbon fillers and 99.95-50 wt % of the mass of the polymer binder.

The nanocarbon-filled polymer material can be produced in the following way. Polyhedral multilayer carbon nanostructures of the fulleroid type or mixtures thereof with nanotubes and fullerenes are introduced, in a quantity from 0.05% to 50 wt % of the total mass of polymer binder to be used, into a suitable quantity of the more or less liquid polymer binder component or of the hardener component that is to cooperate with the binder component to produce the stiff polymer binder, by mixing e.g. in an ultrasound homogenizer. Thus a quantity having a relatively high concentration of the nanostructure additive is produced. The concentrate is then mechanically mixed with the rest of the amount of the binder component and/or the hardener to produce a more or less liquid material that is to bind the carbon fibres by activating the hardener component therein. The carbon fibres in the form of straight filaments are impregnated with the binder by submersion into the tank containing the binder, after which it is passed through a suitable the draw plate, so the main body of the tool is moulded by pulltrusion, see the paper by A. A. Lysenko, "Pulltrusion Technologies", Kompozitsionny Mir, No. 1, SPb, 2007, pp. 8-13.

Instead, the fullerenes can be introduced before impregnating the carbon fibres with the binder, and then the carbon fibres are first passed through a tank containing a solution of fullerenes in e.g. a suitable aromatic hydrocarbon and thereafter through the tank containing the polymer binder.

The formed main body of the tool can have physical and mechanical properties as listed in Table 1.

TABLE 1

Physical and mechanical properties of the main body of a machining tool

| No. | Material of tool main body and its composition | Density (g/cm³) | Strength (MPa) | Modulus of elasticity (GPa) |
|---|---|---|---|---|
| 1 | Carbon-filled polymer based on fabric YSH-60A | 1.95 | 3,830 | 500 |
| 2 | Carbon-filled polymer based on fabric YSH-60A with 0.05% polyhedral nanostructures in relation to the mass of the binder | 1.97 | 3,900 | 550 |
| 3 | Carbon-filled polymer based on fabric YSH-60A with 50% polyhedral nanostructures in relation to the mass of the binder | 2.02 | 3,950 | 580 |
| 4 | Carbon-filled polymer based on fabric YSH-60A with 5% polyhedral nanostructures and 0.5% carbon nanotubes in relation to the mass of the binder (Ratio 10:1) | 2.06 | 4,100 | 640 |
| 5 | Carbon-filled polymer based on fabric YSH-60A with 0.5% polyhedral nanostructures and 5% carbon nanotubes in relation to the mass of the binder (Ratio 1:10) | 2.04 | 4,000 | 610 |
| 6 | Carbon-filled polymer based on fabric YSH-60A with 10% polyhedral nanostructures and 2% fullerenes in relation to the mass of the binder (Ratio 5:1) | 2.03 | 3,940 | 570 |

TABLE 1-continued

Physical and mechanical properties of the main body of a machining tool

| No. | Material of tool main body and its composition | Density (g/cm³) | Strength (MPa) | Modulus of elasticity (GPa) |
|---|---|---|---|---|
| 7 | Carbon-filled polymer based on fabric YSH-60A with 10% polyhedral nanostructures and 0.001% fullerenes in relation to the mass of the binder (Ratio 10 000:1) | 2.05 | 4,050 | 600 |

For comparison Table 1 shows the physical and mechanical properties of a carbon-filled polymer material, see item No. 1, made from carbon fibres of the same kind but with no addition of polyhedral multilayer nanostructures of the fulleroid type or other nanoadditives.

From Table 1 it is obvious that the main body of the machining tool made from carbon-filled polymer material containing a nanostructure material as described above has a significantly higher modulus of elasticity determining the rigidity than a main body of a tool made from carbon-filled polymer material, containing no polyhedral multilayer nanostructures of the fulleroid type. The increase of the modulus of elasticity can typically be at least 10%.

The main body 1 of e.g. the tool illustrated in FIG. 1 or at least the substantial portion thereof, except for example some protective coating, not shown, can be manufactured from the material as described above. It can also be used in the main part of any machining tool supporting a machining head that can have a cutting or abrasive action such as a cutter, a milling head, a drilling tool and a polishing tool. The tool as described herein is suitable for machining surfaces of parts of metal, stone, glass, ceramics, etc.

While specific embodiments of the invention have been illustrated and described herein, it is realized that numerous other embodiments may be envisaged and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A tool for machining surfaces of parts, the tool including a main body, a substantial portion of which includes or is based on carbon fibres, and a machining head, characterized in that the main body is made from carbon fibres bonded by a polymer binder, and additionally contains polyhedral multilayer carbon nanostructures of the fulleroid type in a quantity of 0.05-50 wt % of the mass of the polymer binder.

2. A tool according to claim 1, characterized in that the polyhedral multilayer carbon nanostructures of the fulleroid type have a layer-to-layer distance of 0.34-0.36 nm, an average particle size of 60-200 nm and a specific electric resistance not exceeding $2.5 \times 10^{-4}$ Ohm·cm at a pressure of 1.2 KBar.

3. A tool according to claim 1, characterized in that the main body additionally contains carbon nanotubes taken in the ratio with polyhedral multilayer carbon nanostructures of the fulleroid type from 1:10 to 10:1 with the total content of nanoadditives 0.05%-50 wt % of the mass of the polymer binder.

4. A tool according to claim 1, characterized in that the main body additionally contains fullerenes taken in a weight ratio to the polyhedral multilayer carbon nanostructures of the fulleroid type ranging from 1:5 to 1:10 000 with a total content of nanoadditives in the range of 0.05%-50 wt % of the mass of the polymer binder.

* * * * *